United States Patent
Teachey et al.

(10) Patent No.: US 6,606,966 B1
(45) Date of Patent: Aug. 19, 2003

(54) PRECISION MEDICATION DISPENSER

(76) Inventors: Jim F. Teachey, 122 Martingale La., Wilmington, NC (US) 28409; Ben D. Pratte, 1411 Old Lamplighter Way, Wilmington, NC (US) 28403

( * ) Notice: Subject to any disclaimer, the term of this patent is extended or adjusted under 35 U.S.C. 154(b) by 0 days.

(21) Appl. No.: 10/082,908

(22) Filed: Feb. 26, 2002

(51) Int. Cl.$^7$ ................................................ A01K 5/00
(52) U.S. Cl. ...................... 119/665; 119/56.2; 119/57
(58) Field of Search ................. 119/665, 56.1, 119/56.2, 51.11, 61, 51.01, 51.12, 51.13, 57

(56) References Cited

U.S. PATENT DOCUMENTS

| | | |
|---|---|---|
| 260,373 A | 7/1882 | Erwin |
| 2,538,413 A * | 1/1951 | Chard ........................ 222/650 |
| 3,369,706 A | 2/1968 | Schnyder |
| 3,727,584 A * | 4/1973 | Permann .................... 119/56.1 |
| 3,742,913 A * | 7/1973 | Crippen .................... 119/51.11 |
| 3,800,746 A * | 4/1974 | Stidham .................... 119/56.1 |
| 3,817,216 A * | 6/1974 | Johanson ................... 119/56.2 |
| 3,962,998 A * | 6/1976 | Lynch ....................... 119/56.1 |
| 4,109,835 A | 8/1978 | Castro |
| 4,286,737 A | 9/1981 | Gallant |
| 4,407,434 A | 10/1983 | Kempf |
| 4,562,940 A | 1/1986 | Asphar |
| 4,628,971 A | 12/1986 | Belot |
| 4,974,548 A * | 12/1990 | Lynch ....................... 119/56.1 |
| 5,131,570 A | 7/1992 | Sawyer, III |
| 5,333,795 A | 8/1994 | Jessen |
| 5,503,090 A | 4/1996 | Guzan |
| 5,855,300 A | 1/1999 | Malki |
| 5,944,231 A | 8/1999 | Nuila |
| 6,227,143 B1 * | 5/2001 | Papkov .................... 119/51.11 |

* cited by examiner

*Primary Examiner*—Yvonne Abbott
(74) *Attorney, Agent, or Firm*—MacCord Mason PLLC

(57) ABSTRACT

An apparatus is described for dispensing precise quantities of particulate medication to livestock, in particular sows during gestation. The apparatus includes a medication hopper having a lower discharge opening; a mechanically or electrically actuated measuring valve including a chamber having a volume corresponding to the volume of the desired medication dosage. The chamber is movable between a first position in which the chamber inlet is aligned with the hopper discharge opening and a second position for discharging medication from the chamber. A discharge conduit extends downwardly from the chamber discharge opening, and has outlet end positionable adjacent the area where the medication is to be dispensed. In a preferred embodiment, the apparatus includes wheels and a counter.

21 Claims, 4 Drawing Sheets

PRECISION MEDICATION DISPENSER

BACKGROUND OF THE INVENTION (1) Field of the Invention

The present invention relates generally to an apparatus for dispensing measured amounts of medication to livestock, and in particular to an operator-controlled apparatus for dispensing measured amounts of particulate medication to selected sows among a plurality of sows maintained during gestation in adjacent stalls within a barn.

(2) Description of the Prior Art

In modern pork production, sows are housed in individual stalls within gestation barns. Each barn includes multiple rows of adjacent stalls, each stall normally being about 2'×7'. The front of the stalls in a given row face towards an aisle, with a row of stalls being normally located on either side of the aisle. The sows are normally fed once each day by dispensing pre-measured amounts of feed into a trough in front of the stalls from feed hoppers above the fronts of the stalls. The trough is common to all of the stalls in the row, and can later be flushed and used as a water source by blocking the discharge end of the trough.

During the gestation period, it is also necessary to administer various types of medication, dewormers, feed additives, and the like, referred to herein generally as medication, to the sows. In instances where the medication is to be administered to all of the sows in a given row at the same time, the medication can simply be mixed with the feed, which is then conveyed, such as by an auger, to the individual feed hoppers. However, all of the sows may not be at the same stage of gestation, or may not require a given medication at the same time. Therefore, mixing of the medication into the feed that is provided to all of the sows at the same time, while sometimes practiced, is not a viable solution.

Instead, until the present invention, the normal practice has been for the farm worker to mix the medication into feed batches that are separately hand fed to selected sows, or to walk along the aisle with a container of the medication, such as a bucket, and a measuring scoop, such as a spoon, and manually dispense a scoop of material onto the feed in front of selected sows. This latter procedure is not only time consuming and tiresome, particularly to the back, but is also inaccurate, since the worker may scoop less or more than the accurate amount of medication. In addition, some sows requiring medication may be overlooked. Therefore, there is a need in the industry for a means of quickly and easily dispensing accurately measured amounts of medication to selected sows in a gestation barn.

SUMMARY OF THE INVENTION

The present invention addresses this need by providing an apparatus for dispensing measured amounts of medication to selected sows in a gestation barn. Generally, the apparatus is comprised of a medication hopper with a discharge outlet, a measuring valve to remove predetermined volumes of particulate medication from the medication hopper, and a conduit to convey the selected volumes of medication from the valve to the desired discharge point adjacent the sow's feed area. In addition, a carrying strap may be included if the apparatus is to be carried by the worker. Alternatively, the apparatus may include wheels if the apparatus is to be rolled along an aisleway adjacent the stalls.

The medication hopper preferably tapers inwardly toward its lower end, with a discharge opening being positioned in the lowest end of the hopper. When used, the hopper may be at least partially filled with medication from a bag or other container. Alternatively, an open container of medication may be inverted into the hopper. In another embodiment, the medication hopper may be in the form of a cap having a discharge opening and a threaded rim adapted to receive a container of medication. Other medication hopper configurations will be apparent to one skilled in the art, the only requirement being that a supply of medication is available at the discharge opening for discharge into the measuring valve.

Since precisely measured volumes of medication must be administered, the measuring valve forms a critical component of the apparatus. The valve includes a chamber having a volume corresponding to the volume of the medication to be dispensed, with the chamber being positioned to receive particulate medication from the medication dispenser. The valve further includes a chamber inlet through which medication enters the chamber, and a chamber outlet through which medication is discharged from the chamber. To ensure accuracy, the outlet is closed while the inlet is open for filling of the chamber, with the inlet then being closed prior to opening of the outlet.

In a preferred embodiment, the valve is comprised of a sleeve with a plunger that is snugly slidable within the sleeve. The sleeve, which is positioned horizontally on the apparatus, includes an upper inlet in communication with the hopper discharge port, and an offset lower outlet in communication with the discharge conduit. The plunger, which may be a solid bar, includes a bore that extends vertically transversely through the plunger.

The bore forms the chamber, with the upper opening into the bore forming the chamber inlet and the lower opening into the bore forming the chamber outlet. The sleeve and plunger may be of different cross-sectional profiles, e.g., circular, oval or rectangular. The bore, while conveniently of a circular cross-section, may also be rectangular or oval. Plungers with different volume bores may be used to change the volume of medication dispensed. For example, to simulate dosages currently used, the chamber may have a volume equivalent to one teaspoon, or one or two tablespoons.

The plunger is slidable within the sleeve between a first, or loading, position in which the chamber inlet is aligned with the sleeve inlet, permitting particulate medication to flow into and fill the chamber. In order to dispense the measured volume of material, the plunger is then moved to a second or dispensing position in which the chamber outlet is aligned with the sleeve outlet, allowing the medication to flow from the valve into the discharge conduit.

Movement of the plunger may be effected mechanically or electrically. For example, the valve may include a spring to urge the plunger to the first position, and a cable or cord attached to the plunger. The worker pulls on the cable to pull the valve to the second position. When the cable is released, the valve returns to the first position under the force of the spring. Alternatively, the valve can be attached to a longitudinally aligned solenoid that is in circuit with a battery and a switch, e.g., a pushbutton switch. Activation of the solenoid by pushing the switch to close the circuit moves the plunger to the second position. Other ways to move the plunger between the first and second positions will be apparent to one skilled in the art.

The discharge conduit, which may be a flexible or rigid tube, has a proximal end that is in communication with the valve discharge outlet, and a free distal end that is positionable at the point of discharge, e.g., over the selected sow's feed. In the wheeled embodiment of the invention, the discharge conduit extends to the side of the apparatus so that the worker can simply push the apparatus along the aisleway with the discharge end of the conduit being positioned over the continuous feed trough. When the discharge conduit is over the feed of a selected sow, the worker discharges the chamber, e.g., by pulling on the cable or by pushing the switch.

To ensure that a measured volume of medication is dispensed to each of the selected sows, the apparatus also preferably includes a counter that is triggered each time the valve is moved to the second or dispensing position. This counter may be activated mechanically by contact of a part of the counter with a moveable part of the valve or cable. Alternatively, the counter can be electrically triggered by placement in the circuit with the solenoid and switch. The particular design of the counter is not critical to the invention, so long as the counter registers one count each time the chamber is emptied.

In the wheeled embodiment of the invention, the dispenser is mounted on a base that has attached wheels and a rearwardly extending handle. Preferably, the base includes a rear axle, with wheels on the outer ends of the axle, and a front wheel. The handle may be telescoping. To mechanically actuate the valve, the cable extends along the handle to a distal end at the top of the handle. The distal end of the cable may be attached to a trigger or lever that is moved rearwardly by the worker to pull the valve plunger to its second position. With the electrically actuated valve, the switch is positioned at the upper end of the handle, while the battery may be positioned in the base of the apparatus.

Other details of the structure of the apparatus will be apparent for the drawings and the following detailed description of the invention.

DETAILED DESCRIPTION OF THE INVENTION

Figure 1:
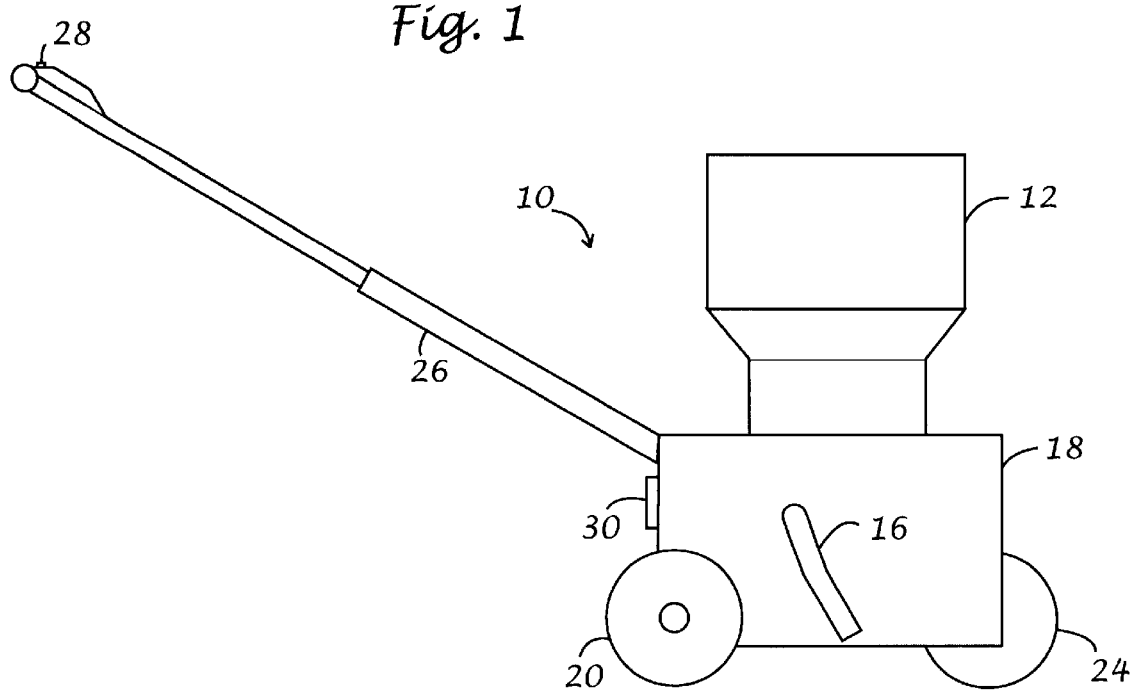
FIG. 1 is a side view of the wheeled embodiment of the invention.
Figure 2:
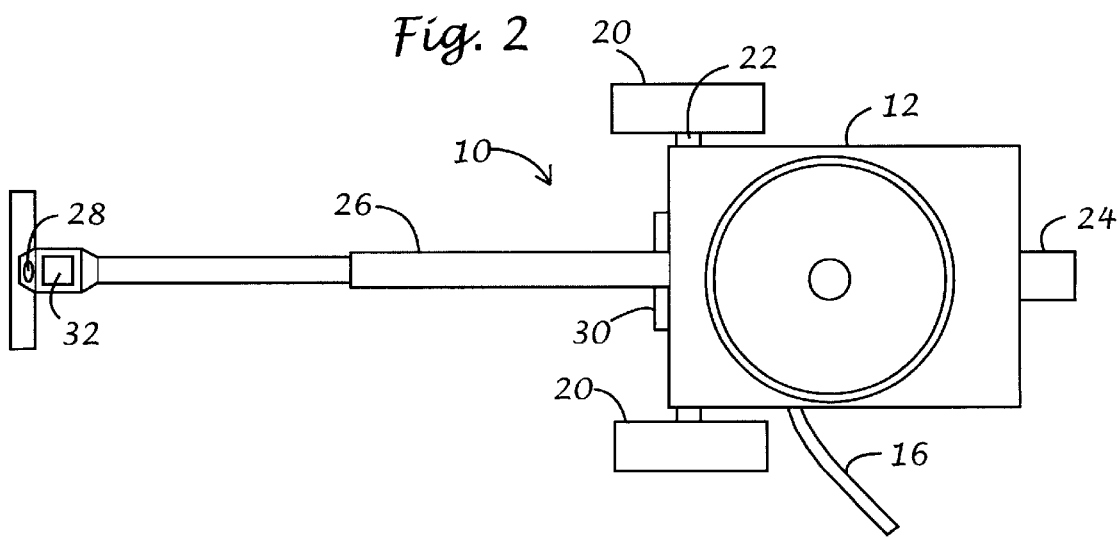
FIG. 2 is a top view of the wheeled embodiment of the invention.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

The wheeled apparatus, generally 10, forming one embodiment of the invention is comprised of a hopper 12, valve 14, a discharge conduit 16, base 18, rear wheels 20 carried on axle 22, a front wheel 24, a telescoping handle 26, a switch 28, a battery 30 and a counter 32. Hopper 12 includes a discharge port 34 at its lower end.

Valve 14 is comprised of sleeve 36, plunger 38, and solenoid 40, which is connected via a circuit (not shown) to switch 28, battery 30 and counter 32. Sleeve 36 includes an upper sleeve inlet 42 in communication with port 34 and a sleeve outlet 44 in communication with conduit 16. Plunger 38 includes vertical transverse bore or chamber 46 open at its upper and lower ends to form a medication measurement chamber. Solenoid 40 in the preferred embodiment is extended when in the unenergized state. It will be understood that a solenoid that is retracted in the unenergized state can be used instead, simply by positioning the solenoid on the opposite end of plunger 38.

Figure 3:
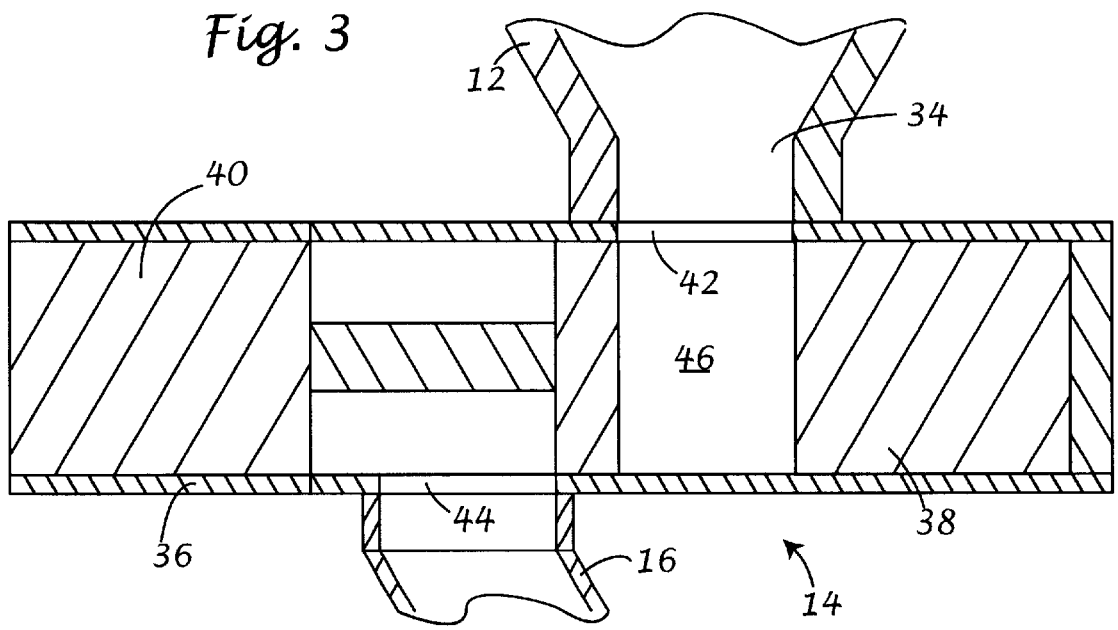
FIG. 3 is a sectional side view of a solenoid actuated valve in the first position.
Figure 4:
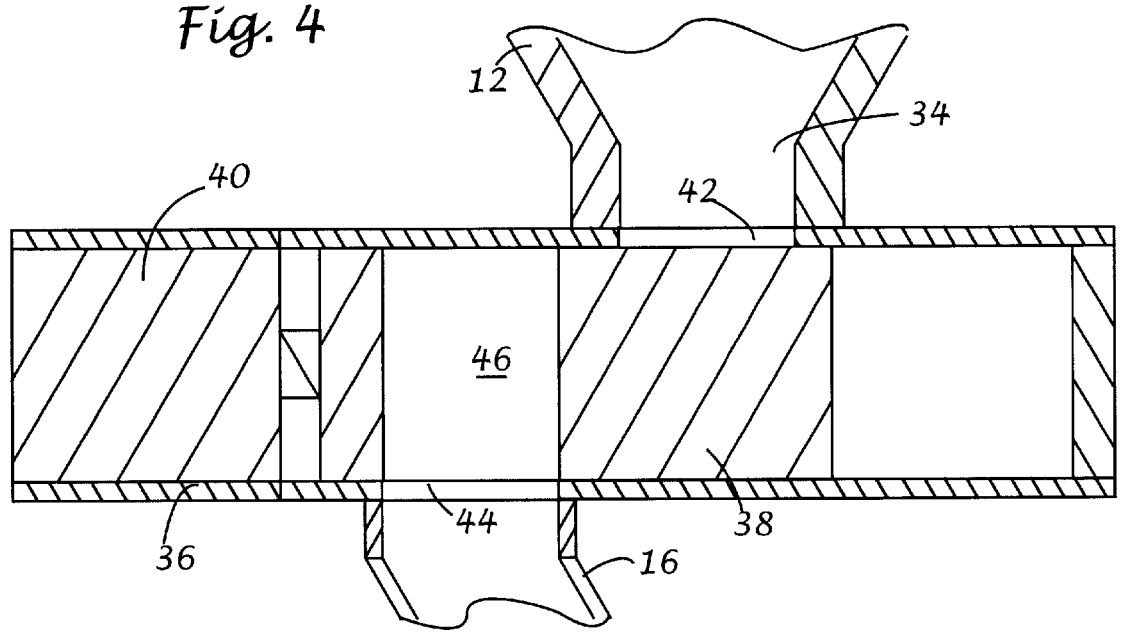
FIG. 4 is a sectional side view of a solenoid actuated valve in the second position.

FIG. 3 is a sectional side view of valve 14 when solenoid 40 is in the unenergized state and plunger is in its first position. When in the first position, particulate medication (not shown) can flow from hopper 12 through discharge port 34 and into bore or chamber 46 until chamber 46 is completely filled. As illustrated in FIG. 4, when switch 28 is closed to complete the circuit, solenoid 40 retracts to move plunger 38 to its second position, aligning chamber 46 over sleeve outlet 44, allowing the particulate medication to flow downwardly through discharge conduit 16.

Figure 5:
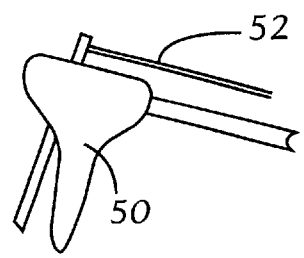
FIG. 5 is a side view of another embodiment of the handle of the wheeled embodiment.
Figure 6:
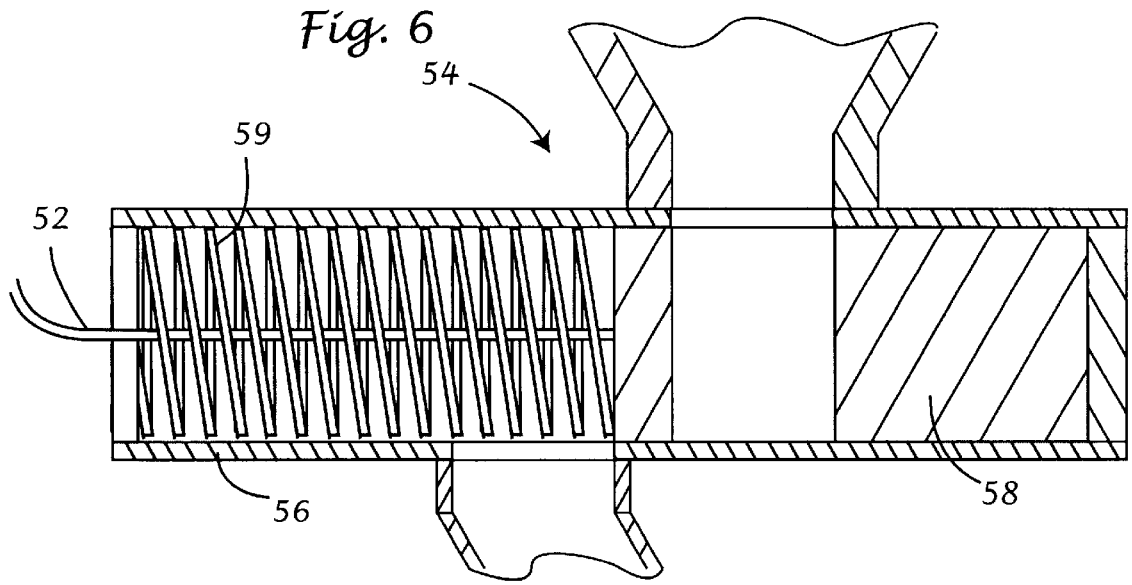
FIG. 6 is a sectional side view of a mechanically actuated valve in the first position.
Figure 7:
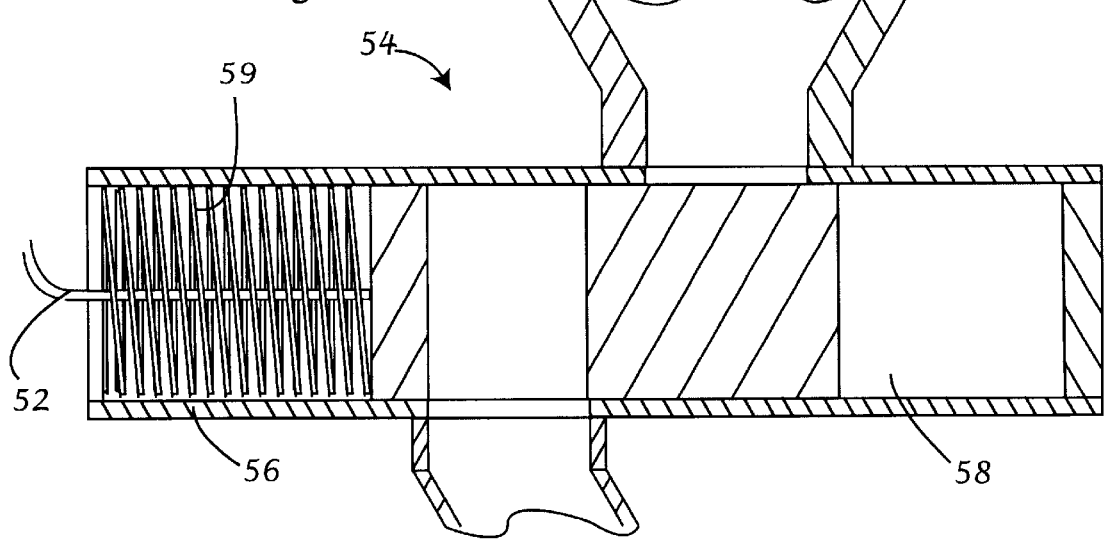
FIG. 7 is a sectional side view of a mechanically actuated valve in the first position.

FIG. 5 illustrates an alternative embodiment in which a trigger 50 mounted at the upper end of handle 26 is connected via cable 52 to a mechanically actuated valve 54, illustrated in FIGS. 6 and 7. Valve 54, like valve 14 is comprised of sleeve 56 and plunger 58. However, instead of solenoid 40, valve 54 includes spring 59 urging plunger 58 to its first position, with cable 52 pulling plunger 58 to its second position upon squeezing of trigger 50.

Figure 8:
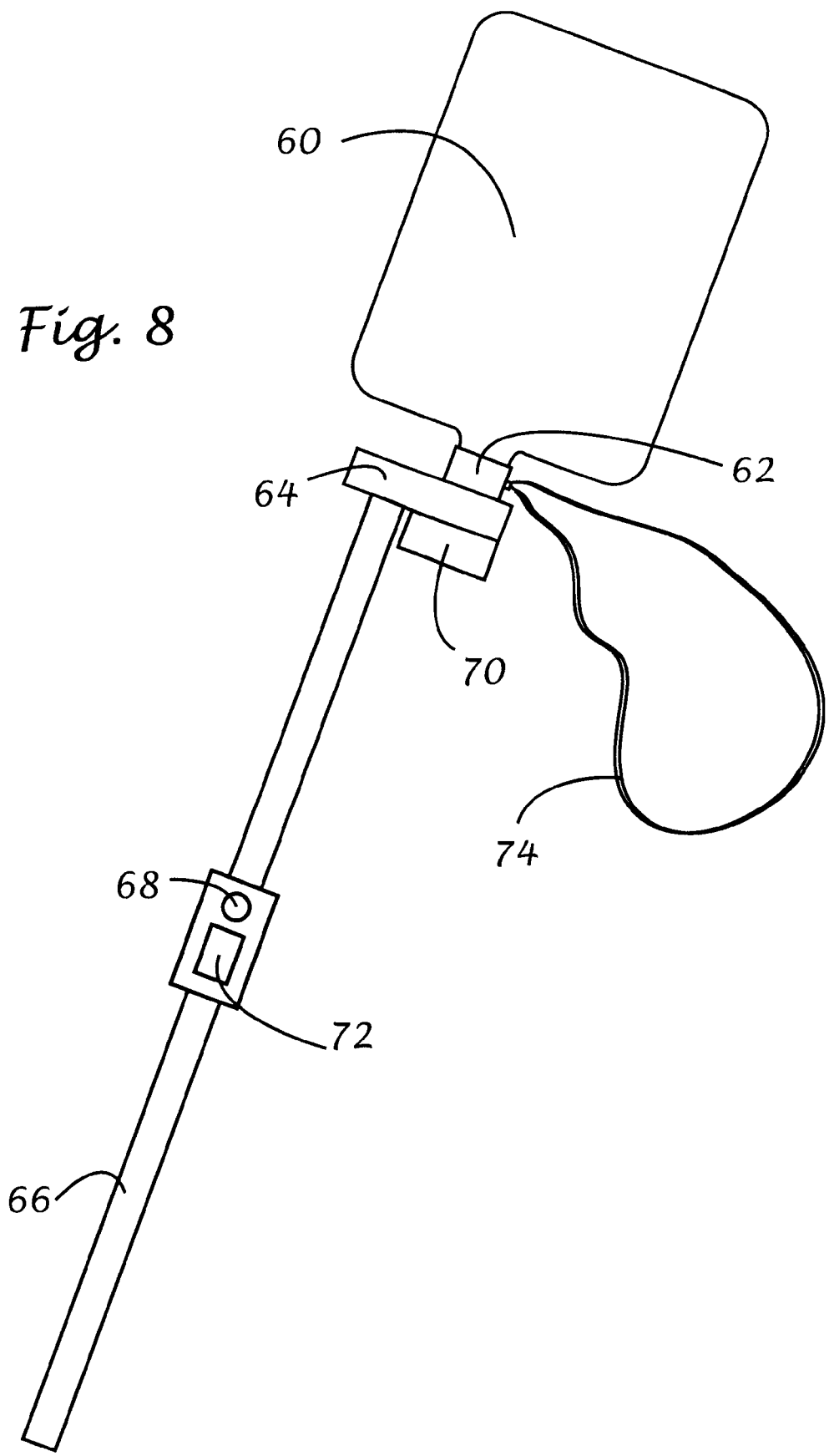
FIG. 8 is a side view of a backpacked embodiment of the invention.

FIG. 8 illustrates an alternative embodiment of the apparatus that is adapted to be carried by the user, instead of being rolled on wheels. The apparatus of FIG. 8 is comprised of hopper 60, which is in the form of an inverted container with a mouth fitted onto cap 62, which includes a discharge port; an electric valve 64 having a construction like previously described valve 14, and a discharge conduit or tube 66. Valve 64 is actuated by pushbutton switch 68, powered by battery 70. The number of times switch 68 is closed is counted with counter 72, which is in circuit with valve 64, switch 68 and battery 70. Strap 74 can be used to carry the apparatus.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An apparatus for dispensing measured quantities of particulate medication onto a livestock feed area comprising:

a) a medication hopper having a lower discharge opening;

b) a measuring valve with a chamber having a volume corresponding to the volume of the desired medication dosage, an inlet between said chamber and said hopper discharge opening for transferring medication from said hopper to said chamber, and a discharge opening;

c) a discharge conduit extending downwardly from said valve discharge opening, said conduit having an outlet end positionable adjacent said feed area; and d) a wheeled support.

2. The apparatus of claim 1, wherein said valve includes an actuator for moving said chamber from a first position beneath said hopper discharge opening to a second position in communication with said conduit inlet end.

3. The apparatus of claim 1, wherein said conduit is a tube extending to the side of said apparatus.

4. An apparatus for dispensing measured quantities of particulate medication onto a livestock feed area comprising:
   a) a medication hopper having a lower discharge opening;
   b) a measuring valve including a chamber having a volume corresponding to the volume of the desired medication dosage, said chamber having an inlet opening and a discharge opening, said chamber being movable between a first position in which said chamber inlet opening is aligned with said hopper discharge opening and a second position for discharging medication from said chamber through said chamber discharge opening;
   c) a discharge conduit extending downwardly from said chamber discharge opening, said conduit having an outlet end positionable adjacent said feed area;
   d) a wheeled support for said hopper; and
   e) an elongated handle.

5. The apparatus of claim 4, wherein said wheeled support includes two rear wheels and one front wheel.

6. The apparatus of claim 4, wherein said discharge conduit extends to the side of said apparatus.

7. The apparatus of claim 4, wherein said discharge conduit is a flexible tube.

8. The apparatus of claim 4, wherein said hopper is adapted to receive an inverted container of particulate medication.

9. The apparatus of claim 4, wherein said measuring valve includes a sleeve having longitudinally spaced inlet and outlet openings, and a plunger moveable between first and second positions within said sleeve, said plunger including a transverse bore of a given volume forming said chamber, said bore being aligned with said sleeve inlet opening when said plunger is in said first position and aligned with said sleeve outlet when said plunger is in said second position.

10. The apparatus of claim 9, wherein said plunger is replaceable with a plunger having a bore of a different given volume.

11. The apparatus of claim 4, wherein said apparatus further includes an actuator for moving said plunger between first and second positions, said actuator being attached to said handle.

12. A wheeled apparatus for dispensing measured quantities of particulate medication onto a livestock feed area comprising:
   a) a wheeled support having a rearwardly extending elongated handle with a distal end;
   b) a medication hopper having a lower discharge opening carried on said support;
   c) a measuring valve with a horizontal sleeve having an upper inlet in communication with said hopper discharge opening and a lower outlet, said outlet being offset from said inlet, and a plunger including a chamber having an upper inlet, a lower outlet, and a volume corresponding to the volume of the desired medication dosage, said plunger being slidable within said sleeve between a first position in which said chamber inlet is aligned with said sleeve inlet to fill said chamber with medication and a second position in which said chamber outlet is aligned with said sleeve outlet to discharge a measured dosage of medication from said valve;
   d) a discharge tube extending downwardly from said valve discharge opening and to the side of said support, said conduit having a proximal end in communication with said sleeve outlet and a distal end positionable adjacent said feed area; and
   e) an actuator for moving said plunger between said first and second positions.

13. The apparatus of claim 12, wherein said valve further includes a battery-powered solenoid and said actuator is a switch in communication with said solenoid.

14. The apparatus of claim 12, wherein said valve further includes a spring urging said chamber to said first position, and said controller is a cable attached to said chamber, said cable having a distal end adjacent the distal end of said handle.

15. The apparatus of claim 12, wherein said hopper is adapted to receive an inverted container of medication.

16. The apparatus of claim 12, wherein said wheeled support includes a rear axle, two wheels carried on said rear axles, and a front wheel.

17. The apparatus of claim 12, wherein said handle is a telescoping handle.

18. An apparatus for dispensing measured quantities of particulate medication onto a livestock feed area comprising:
   a) a medication hopper having a lower discharge opening;
   b) a measuring valve with a chamber having a volume corresponding to the volume of the desired medication dosage, an inlet between said chamber and said hopper discharge opening for transferring medication from said hopper to said chamber, and a discharge opening;
   c) a discharge conduit extending downwardly from said valve discharge opening, said conduit having an outlet end positionable adjacent said feed area; and
   d) a counter for counting the number of times said chamber is moved to said second position.

19. The apparatus of claim 18, further including a carrying strap.

20. The apparatus of claim 18, wherein said valve includes an actuator for moving said chamber from a first position beneath said hopper discharge opening to a second position in communication with said conduit inlet end.

21. The apparatus of claim 18, wherein said conduit is a tube extending to the side of said apparatus.

* * * * *